US 6,178,379 B1

(12) United States Patent
Dwyer

(10) Patent No.: US 6,178,379 B1
(45) Date of Patent: Jan. 23, 2001

(54) METHOD AND APPARATUS OF MONITORING A NAVIGATION SYSTEM USING DEVIATION SIGNALS FROM NAVIGATION SENSORS

(75) Inventor: David B. Dwyer, Scottsdale, AZ (US)

(73) Assignee: Honeywell International Inc., Morristown, NJ (US)

( * ) Notice: Under 35 U.S.C. 154(b), the term of this patent shall be extended for 0 days.

(21) Appl. No.: 08/961,848

(22) Filed: Oct. 31, 1997

(51) Int. Cl.[7] .............................. G08G 5/00; G01S 5/14; G05D 1/02
(52) U.S. Cl. .................. 701/205; 701/9; 701/11; 701/215; 244/175
(58) Field of Search ................... 701/9, 11, 205, 701/215, 23, 41; 244/175, 194, 195; 340/945, 963; 342/457, 357.06, 357.12, 357.17; 180/168

(56) References Cited

U.S. PATENT DOCUMENTS

| | | | |
|---|---|---|---|
| 5,361,212 | 11/1994 | Class et al. | 364/428 |
| 5,512,903 | 4/1996 | Schmidtke et al. | 342/357 |
| 5,570,097 | 10/1996 | Aguado | 342/357 |
| 5,600,329 | 2/1997 | Brenner | 342/357 |
| 5,610,616 | 3/1997 | Vallot et al. | 342/357 |
| 5,663,732 | 9/1997 | Stangeland et al. | 342/357 |

FOREIGN PATENT DOCUMENTS 43 14 742  5/1993 (DE) .

OTHER PUBLICATIONS

Gucciardo, R., Flight Inspection—The "State of the Art", Digital Avionics Systems Conference, Phoenix, Oct. 30,–Nov. 3, 1994, IEEE, Conference 13, Oct. 30, 1994, pp. 221–226.

*Primary Examiner*—Michael J. Zanelli

(57) ABSTRACT

A high integrity navigation system is created using a low integrity navigation computer monitored by a high integrity system. A navigation sensor (e.g. DGPS, GPS, ILS, MLS, and the like) is programmed with a desired trajectory. The navigation sensor calculates the vehicle position and generates a deviation signal indicative of the deviation of the vehicle from the desired trajectory. The navigation computer uses the deviation signal in the control law computations to generate steering commands for controlling the vehicle. The navigation sensor monitors the deviation of the vehicle from the desired trajectory. If the deviation exceeds a predetermined threshold, an integrity alarm signal is communicated to a display or other alarm to alert the operator.

13 Claims, 3 Drawing Sheets

METHOD AND APPARATUS OF MONITORING A NAVIGATION SYSTEM USING DEVIATION SIGNALS FROM NAVIGATION SENSORS

BACKGROUND OF INVENTION

The present invention relates generally to control systems and more specifically to high integrity control systems.

High integrity systems are critical to many control applications. Aircraft, for example, require certain systems to have very high integrity. An example of a high integrity system is an autopilot which controls the flight control surfaces of an aircraft. High integrity systems are necessarily more expensive due to the added complexity of design, testing, etc. Fortunately, not all aircraft systems are required to be high integrity. Some systems may be low integrity if they do not control critical functions or if they can be monitored by a high integrity system.

These limitations can cause many problems in a control system. For example, in a control system for an aircraft these limitations cause the flight deck to be fragmented and function as numerous independent systems which require much pilot attention and workload. The systems are unable to function as a thoroughly integrated control system. A reason for this is that the flight management system (FMS) (i.e. the brains of the aircraft) is not certified to high integrity standards. The highly complex nature of an FMS makes it nearly impossible for the FMS to be certified to high integrity. An FMS typically stores the entire flight plan of the aircraft from take-off to landing, communicates with numerous other systems, and contains a very large navigation data base used to guide the aircraft.

It is desirable for a pilot to be able to program the FMS and have the FMS control the aircraft from take-off to landing with little intervention by the pilot. However, this is not permitted if high integrity maneuvers(e.g. approach and landings) are required due to the low integrity status of the FMS. Consequently, pilots are required to activate and program many aircraft systems.

Prior systems have tried to solve these problems. One prior approach is to use high integrity global positioning system(GPS) units to monitor the trajectory of the aircraft as it is being flown using other navigation systems. If predetermined tolerances are exceeded, the GPS unit activates an alarm. The GPS units are programmed with the trajectory coordinates from either a ground station or a control panel. The problem with this arrangement is that false alarms may be activated if the coordinates in the navigation system database do not match the coordinates in the GPS.

Control systems would be improved by a system which allows high integrity navigation system monitor a low integrity system with reduced risk of false alarms.

Clearly there exists the need for an improved high integrity control system.

SUMMARY OF THE INVENTION

The invention discloses a high integrity navigation system created using a low integrity navigation computer which is monitored by a high integrity navigation sensor or display. A navigation sensor (e.g. DGPS, GPS, ILS, MLS, and the like) is programmed with a desired trajectory. The navigation sensor calculates the vehicle position and communicates deviation signals to the navigation computer which are indicative of the deviation of the vehicle from the desired trajectory. The navigation computer uses the deviation signals in the control law computations to generate steering commands for controlling the vehicle. The navigation sensor monitors the deviation of the vehicle from the desired trajectory. If the deviation exceeds a predetermined threshold, an integrity alarm signal is communicated to a display or other alarm to alert the operator.

In an alternate embodiment, a second high integrity system monitors signals from both the navigation sensor and the navigation computer to detect malfunctions in the navigation computer. Examples of other high integrity systems in aircraft include electronic flight instrument systems (EFIS), inertial reference systems (IRS), and flight guidance computers (FGC).

The invention is particularly useful in avionics systems having a flight management system(FMS), navigation computer, other like system for controlling the lateral and vertical trajectory of an aircraft.

Therefore, the object of the invention is to provide improved integrity monitoring of an FMS or similar system.

A feature of the invention is a navigation computer calculating steering commands as a function of deviation signals as opposed to trajectories computed using the navigation computer database.

Another feature of the invention is a second high integrity system (e.g. an EFIS) monitoring signals from both the navigation sensor and the navigation computer to detect malfunctions in the navigation computer.

An advantage of the invention is reduced false integrity alarms.

The significant features of the invention are illustrated in the figures and described more fully below.

DETAILED DESCRIPTION

Figure 1:
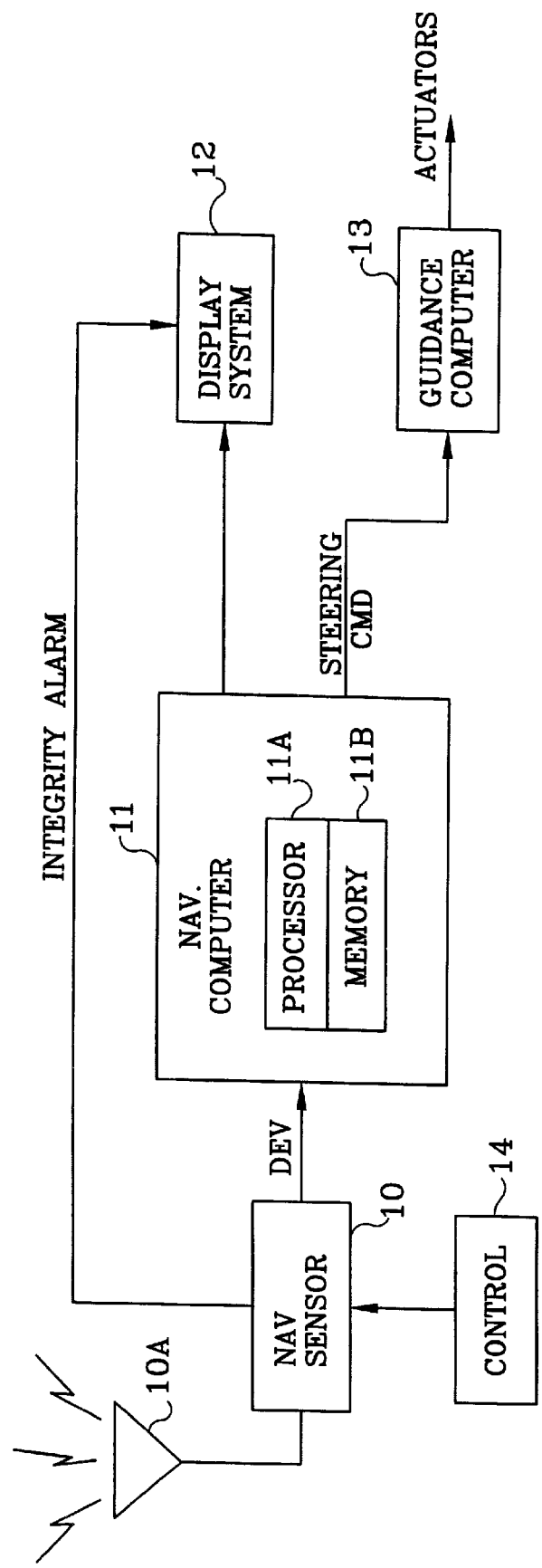
FIG. 1 is a block diagram of the invention.

FIG. 1 is a block diagram of the invention. Shown in FIG. 1 are navigation sensor 10, navigation computer 11, display system 12, guidance computer 13, and control unit 14. Navigation sensor includes antenna 10A for receiving navigation signals. Navigation sensor is any high integrity navigation sensor, including, but not limited to, GPS, DGPS, ILS, MLS, and the like. This description is in terms of aircraft avionics, however, the invention is also useful in other vehicle applications.

Control unit 14 communicates the desired aircraft trajectory to navigation sensor 10. The navigation sensor uses the desired trajectory information to compute a deviation signal representative of the deviation of the aircraft from the desired trajectory. Control unit 14 may be any device suitable for providing desired trajectory data including, but not limited to, a dedicated control panel, another aircraft system, or a data link for receiving trajectory data from an external source. The preferred embodiment receives data from a ground station via a data link. Of course, if an ILS or MLS navigation sensor is used, there is no need for a control unit to provide desired trajectory data since the trajectory data is part of the ILS and MLS navigation signal.

The navigation sensor 10 monitors the aircraft deviation from the desired trajectory. If the deviation exceeds predetermined limits, an integrity alarm signal is communicated to an alarm or similar device to notify the pilot of the condition. FIG. 1 shows the integrity alarm communicated to a display system which displays a representative message.

The navigation sensor 10 communicates the deviation signal to navigation computer 11. Navigation computer 11 is any system suitable for generating steering commands. In an aircraft this could be an FMS, navigation system, or the like. Navigation computer 11 includes a processor 11A and memory 11B for accomplishing the steering computations.

Unlike previous systems, navigation computer 11 computes steering commands as a function of the deviation signal. This eliminates false alarms due to errors in a self contained data base. The steering commands, both lateral and vertical, are communicated to the guidance computer 13 which implements the commands.

Navigation computer 11 also generates various display signals representative of data to be displayed by display system 12.

Figure 2:
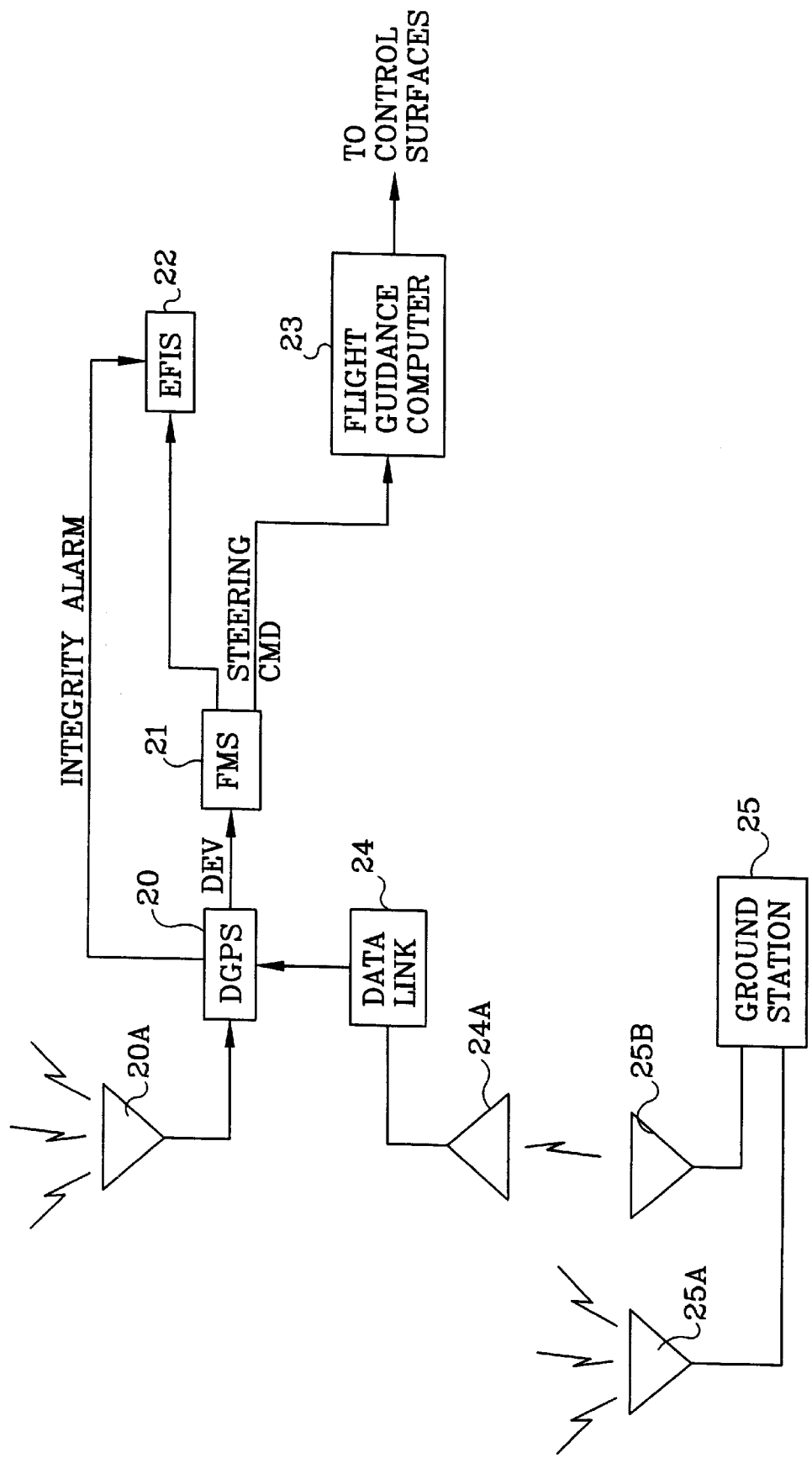
FIG. 2 is the preferred embodiment of the invention.

FIG. 2 illustrates the preferred embodiment of the invention as an avionics control system.

Shown in FIG. 2 are differential global positioning system sensor (DGPS) 20, FMS 21, EFIS 22, FGC 23, data link 24, and ground station 25. DGPS 20 includes antenna 20A for receiving navigation signals from multiple navigation satellites (not shown). Data link 24 communicates both differential correction data and desired trajectory data to DGPS from ground station 25 via data link antennas 24A and 25B. DGPS 20 uses the navigation signals, differential correction data, and trajectory data to generate a deviation signal which is communicated to FMS 21. DGPS 20 also monitors the aircraft deviation such that if the aircraft deviation exceeds predetermined limits and integrity alarm is communicated to EFIS 22.

FMS 21 generates steering commands as function of deviation signals. The steering commands are communicated to flight guidance computer 23 which implements the commands.

Ground station 24 is a differential GPS ground station. Navigation signals are received from navigation satellites via antenna 25A. Ground station 25 computes the difference between the known position of the antenna 25A and the satellite calculated position to produce a difference signal. The difference signal is communicated to the aircraft via antennas 25B and 24A and data link 24.

Figure 3:
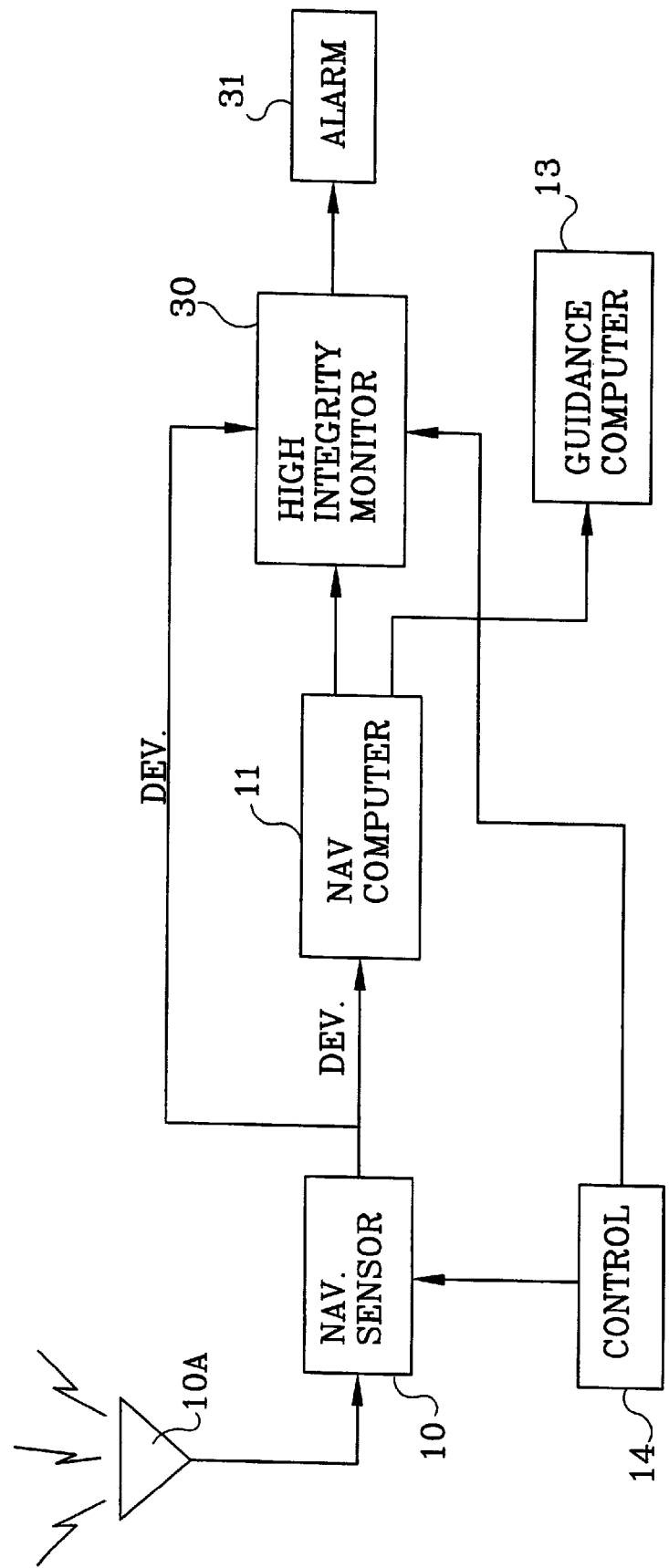
FIG. 3 is an alternate embodiment of the invention.

FIG. 3 illustrates an alternate embodiment of the invention where a second high integrity device monitors the navigation computer. Navigation sensor 10 functions similarly to the navigation sensor of FIG. 1 but without the need to monitor aircraft deviation. The deviation signal is communicated to the navigation computer 11 and a second high integrity monitor 30. High integrity monitor 30 is an EFIS, FGC, or similar device.

High integrity monitor 30 compares the deviation signal with data received from navigation computer 11 to detect a malfunction in navigation computer 11. High integrity monitor 30 also may receive desired trajectory data from control unit 14 to use in detecting malfunctions. If a malfunction is detected and alarm signal is communicated to alarm 31.

Navigation computer 11 functions as described in FIG. 1 above. Navigation computer 11 may generate special signals to communicate to monitor 30 for use in detection malfunctions. In the alternative, Control unit 14, and guidance computer 13 function as described in FIG. 1.

This description has been for descriptive purposes only and is not intended to limit the scope of the invention. Those skilled in the art will recognize numerous alternate embodiments of the invention which deviate from the described embodiment but still perform the same work in substantially the same way to achieve substantially the same result and are therefore equivalent to the invention.

It is clear from the foregoing that the present invention represents a new and useful method and apparatus for monitoring low integrity systems.

The embodiments of an invention in which an exclusive property or right is claimed are defined as follows:

1. A control system for an aircraft comprising:
   a navigation sensor configured to receive navigational signals, and to generate a deviation signal indicative of the deviation of said aircraft from a desired trajectory; and,
   a navigation computer in communication with said navigation sensor, said computer configured to receive said deviation signal and to generate aircraft steering commands therefrom.

2. The control system according to claim 1 wherein said navigation sensor is operationally coupled to an alarm such that said alarm is activated when said deviation signal exceeds predetermined limits.

3. The control system according to claim 2 wherein:
   a) said navigation computer generates display signals as a function of said deviation signals; and,
   b) said alarm is a display system in communication with said sensor and said navigation computer, said display system operable to compare said display signals and said deviation signals and notify a pilot of a malfunction in said navigation computer as a result thereof.

4. The control system according to claim 2 wherein said navigation sensor is a differential global positioning system sensor.

5. The control system according to claim 1 further comprising a control unit in communication with said navigation sensor, said control unit providing desired trajectory data to said navigation sensor.

6. The control system according to claim 5 wherein said control unit is a data link to a GPS ground station.

7. A high integrity navigation system for a vehicle comprising;
   a) navigation sensor means for receiving navigation signals and generating a deviation signal indicative of the deviation of said vehicle from a desired trajectory;
   b) computation means in communication with said navigation sensor means for generating vehicle steering commands as a function of said deviation signal.

8. The high integrity navigation system according to claim 7 further comprising:
   a) alarm means for alerting an operator; and,
   b) where said navigation sensor means is in communication with said alarm means and includes means for detecting if said vehicle's deviation from a desired trajectory exceeds a predetermined limit and activating said alarm means in response thereof.

9. The high integrity navigation system according to claim 7 further comprising high integrity system means, in communication with said navigation sensor means and said alarm means, monitoring said deviation signal and activating said alarm means if the deviation of said vehicle exceeds predetermined limits.

10. The high integrity navigation system according to claim 7 wherein:
    a) said computation means generates display signals as a function of said deviation signals; and, b) said alarm means is a display system in communication with said computation means, said display system operable to compare said display signals and said deviation signals to detect inconsistencies indicative of a malfunction in said computation means and alert the operator thereof.

11. The high integrity navigation system according to claim 7 further comprising:
   a) high integrity monitor means in communication with said computation means, said navigation sensor means, and said alarm means, for comparing outputs of said computation means with said deviation signals to detect a malfunction in said computation means and to activate said alert means in response thereof.

12. The high integrity navigation system according to claim 7 further comprising a control unit means, in communication with said navigation sensor means, for providing desired trajectory data to said navigation sensor means.

13. A method of navigating an aircraft having a navigation sensor, a navigation computer, and an alarm indicator, said method comprising the steps of:
   a) receiving navigation signals by said navigation sensor;
   b) determining aircraft deviation from a trajectory in said navigation sensor;
   c) generating a deviation signal indicative of said deviation in said navigation sensor;
   d) communicating said deviation signal to said navigation computer;
   e) generating aircraft steering commands as a function of said deviation signals in said navigation computer;
   f) comparing the deviations of step b) with predetermined limits in the navigation sensor; and,
   g) activating the alarm by the navigation sensor when the predetermined limits are exceeded.

* * * * *